(12) United States Patent
IL-Joo

(10) Patent No.: US 6,263,907 B1
(45) Date of Patent: *Jul. 24, 2001

(54) VALVE DEVICE OF A STORAGE TANK FOR TRANSPORTING OILS OR CHEMICAL COMPOUNDS

(75) Inventor: Kwang IL-Joo, KimHae-Si (KR)

(73) Assignee: Korea Steel Power Co., Ltd., Kimhae-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/474,153

(22) Filed: Dec. 29, 1999

Related U.S. Application Data

(63) Continuation-in-part of application No. 09/159,796, filed on Sep. 24, 1998, now Pat. No. 6,029,706.

(30) Foreign Application Priority Data

Aug. 28, 1998 (KR) .................................................. 98-16471

(51) Int. Cl.[7] .................................................. F16K 17/12
(52) U.S. Cl. ................ 137/471; 137/493.8; 137/533.21; 137/534
(58) Field of Search ................ 137/471, 493.8, 137/493.9, 529, 533.21, 533.31, 534

(56) References Cited

U.S. PATENT DOCUMENTS

| | | | | |
|---|---|---|---|---|
| 4,938,247 | * | 7/1990 | Yandle, II | 137/590 |
| 5,060,688 | * | 10/1991 | Sorensen | 137/471 |
| 5,465,753 | * | 11/1995 | Schwartz | 137/587 |
| 5,873,384 | * | 2/1999 | Pedersen et al. | 137/471 |
| 6,029,706 | * | 2/2000 | Joo | 137/493.8 |

* cited by examiner

Primary Examiner—Michael Powell Buiz
Assistant Examiner—Ramesh Krishnamurthy
(74) Attorney, Agent, or Firm—Notaro & Michalos P.C.

(57) ABSTRACT

A valve device for a storage tank for transporting oils or chemical compounds, includes an upper body having a V-shaped valve seat at an upper end thereof. At least one screw hole with a closing cock is provided in the upper body. A lower body connected to the upper body, has an enforcing frame forming a plurality of pathways between connection spokes. A stem having a three-stepped rod extends over the valve seat. A disc is coupled to a flange by a ring by bolts. The flange is supported by a plurality of spokes to a bush fixed to the rod. Hammering prevention discs are fixed to a middle portion of the rod as is a weight connected below the discs. Bushings are between the discs and all are hold to the rod by a lock nut. A cap having a main hole receives the bottom end of the stem rod and two more holes in the cap communicate with the hole to allow the bottom end of the rod to move in the cap.

1 Claim, 4 Drawing Sheets

VALVE DEVICE OF A STORAGE TANK FOR TRANSPORTING OILS OR CHEMICAL COMPOUNDS

CROSS-REFERENCE TO RELATED APPLICATION

This is a continuation-in-part application of application Ser. No. 09/159,796 filed Sep. 24, 1998, which is incorporated here by reference and is now U.S. Pat. No. 6,029,706.

BACKGROUND OF THE INVENTION

1. Field of the Invention

The present invention relates to a valve device of a storage tank for transporting oils or chemical compounds, and more particularly, to a valve for maintaining the pressure of the storage tank to be always safe by preventing supersaturated pressure or negative pressure which is the opposite phenomenon of the supersaturated pressure, the supersaturated pressure being generated in the storage tank of transportation vessels such as an oil tanker. Also, the valve device in the present invention prevents the entry of flames into the storage tank from outside the storage tank.

2. Description of the Related Art

Usually, supersaturated pressure and negative pressure (vacuum phenomenon) are generated frequently in storage tanks for storing various oils or chemical compounds. The pressure in a storage tank can be increased by volatile gases from various oils or chemical compounds stored in the storage tank. Pressure in the tank can also vary due to changes in temperature in different climates in each district when an oil tanker or a transportation vessel of chemical compounds sails in the wide ocean. In almost all such cases, supersaturated pressure is generated. If an oil or a chemical compound is discharged from the storage tank by pumping, the pressure is lowered in the storage tank and negative pressure (vacuum phenomenon) is caused.

If the pressure is changed in a closed space, not only oils or chemical compounds which are highly explosive and inflammable become unstable, but also here is a high probability for an explosion or fire to occur. A serious accident results if such a storage tank explodes. Therefore, every storage tank for storing oils or chemical compounds is equipped with vent pipes which are connected to the outside at all times. However, since these vent pipes are always open, a large amount of oils or chemical compounds are evaporated through them. This eventually causes economic loss as well as contaminated air.

There have been a few inventions to resolve the above-identified problems. They include Korean Utility Model Registration No. 125817 entitled "A valve device for absorbing or discharging air of a transportation tank of oils or chemical compounds" owned by the applicant of the present invention, and U.S. Pat. No. 5,060,688. In these invention, however, suction means for external air into the storage tank and discharging means for expanded gases which discharge volatile gases from the storage tank, are separated from each other, crossing at a right angle and are connected to each other by means of other connection pipes. They are therefore disadvantageous in that they occupy a large installation space. Further, there is a problem of increasing the weight of a vessel if the above conventional equipments are installed in a transportation vessel since their own weight is considerable. Since more than ten of these devices are installed in one vessel, their weight is not insignificant. Further, it has been inconvenient to repair them since their unit price has increased and their structure is unreasonably complicated. Still further, it has been difficult to clean foreign materials trapped inside the device when it is in use.

SUMMARY OF THE INVENTION

It is therefore an object of the present invention for solving the above problem by providing a valve device of a storage tank for transporting oils or chemical compounds which prevents supersaturated pressure and negative pressure generated inside the storage tank of a transportation vessel for moving oils or chemical compounds such as an oil tanker, and for maintaining safe pressure at all times.

The above object can be achieved according to the present invention with a valve device of a storage tank for transporting oils or chemical compounds, including: an upper body having an inclined hole including a V-type groove at an upper portion thereof and, at least, more than one screw hole to assemble a cock at a lower portion thereof; a lower body having two terminals, where an enforcing frame forming a plurality of pathways is formed as an entity for connection irons; a stem having three-terminal ring-type rod portions extending as an entity at a lower portion of a terminal, and a screw portion; a disc coupled by bolts to a protrusion having the form of a ring, the protrusion being supported by a plurality of enforcing irons; two hammering prevention discs assembled with a ring-type rod portion of the stem; a weight assembled at a lower portion of the hammering prevention discs; three bushings assembled between the hammering prevention discs and the weight; a lock nut assembled at a bottom surface of the weight; the enforcing frames for assembling the disc by the bolts; and, a cap having a hole for inserting the ring-type rod portion of the stem.

BRIEF DESCRIPTION OF THE DRAWINGS

A more complete appreciation of this invention and many of the attendant advantages thereof, will be readily apparent as the same becomes better understood by reference to the following detailed description when considered in conjunction with the accompanying drawings, in which like reference symbols indicate the same or similar elements and wherein.

DETAILED DESCRIPTION OF THE PREFERRED EMBODIMENTS

Hereinafter, a preferred embodiment of the present invention will be explained in detail with reference to the accompanying drawings.

Figure 1:
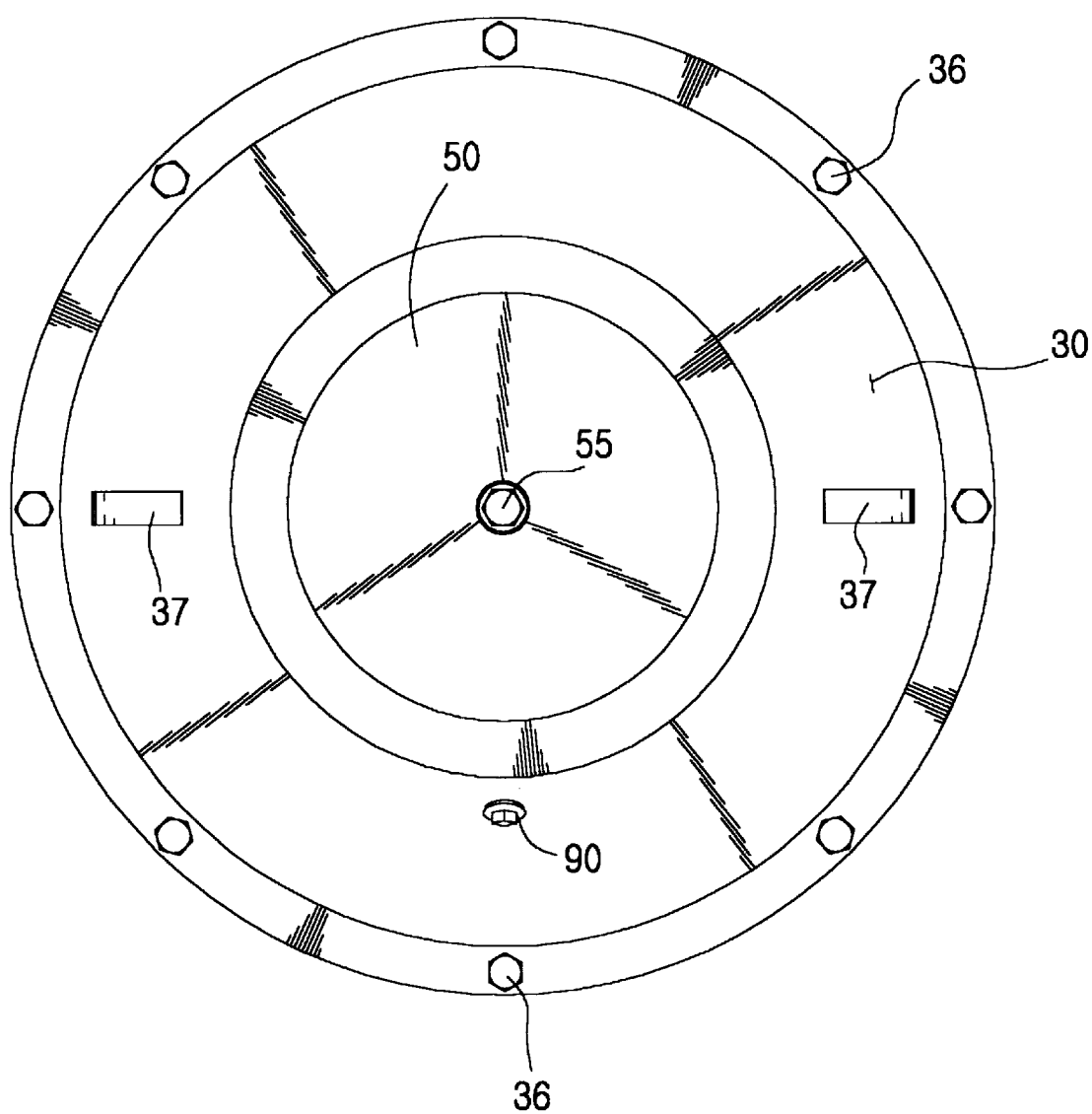
FIG. 1 is a plane view showing a preferred embodiment of the present invention.
Figure 2:
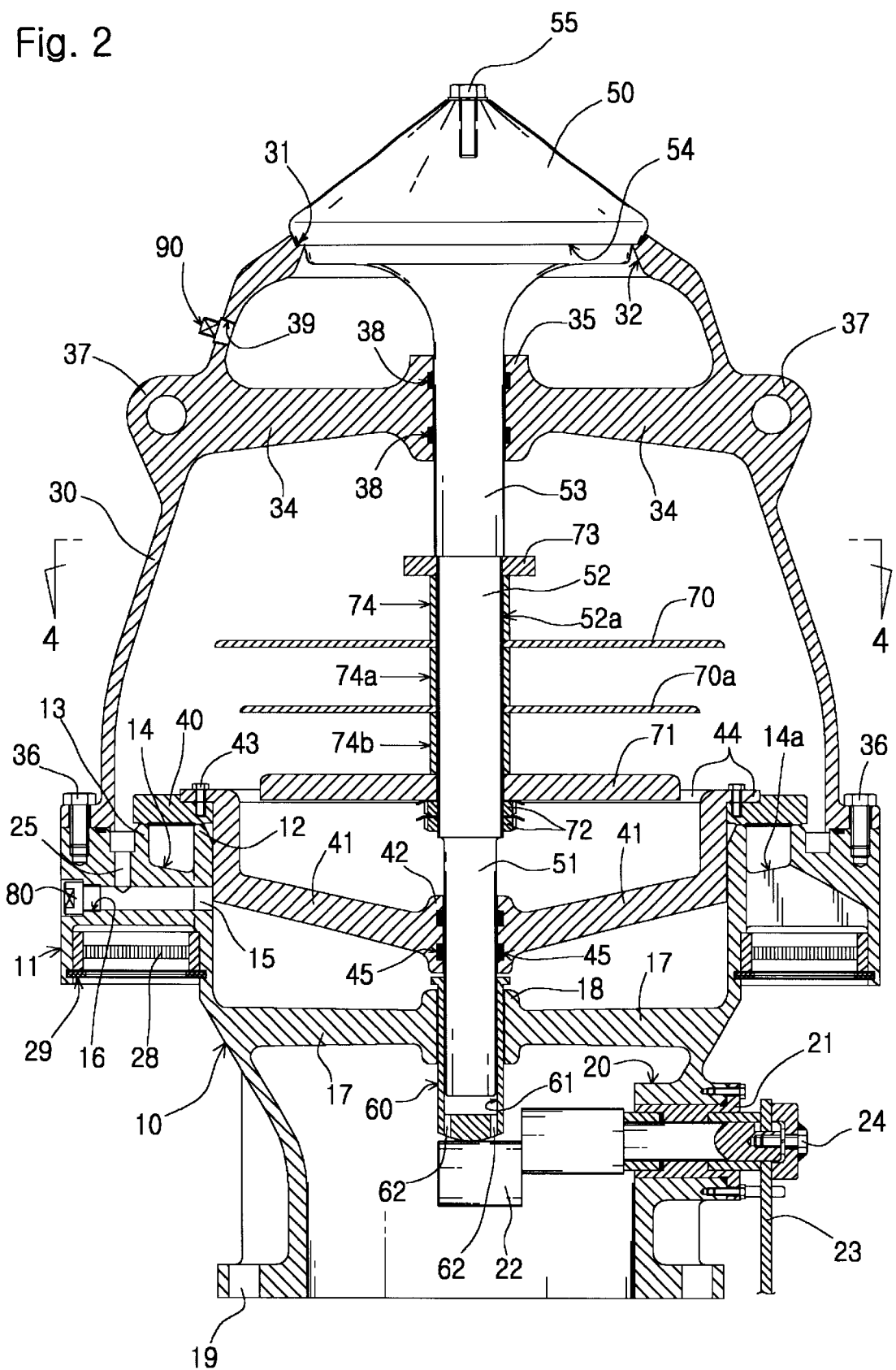
FIG. 2 is a sectional view showing the structure of the present invention.

FIG. 1 is a plane view showing a preferred embodiment of the present invention, which is comprised of bolts 36 for assembling an upper body 30 in the form of a circular cone from which a conic stem 50 extends, and a lower body 10 in the form of a cylinder including an enforcing frame 11 as shown in FIG. 2. FIG. 1 also shows the position of a cock 90 in the upper body 30.

FIG. 2 is a sectional view showing the structure of the present invention. At the perimeter of lower body 10, the enforcing frame 11 is connected as an entity by connection irons or spokes 14 and 14a. The upper body 10 is a casting, which is also the case for the upper body 30. Formed inside the enforcing frame 11 are rings 12 and 13 with upper surfaces that are ground smoothly by a grinding process. The bottom surface of a disc 40 as described below is also grinded smoothly and engages the rings. Between the enforcing frame and the lower body, a usual reverse-flow prevention filter 28 is inserted, which is fixed by a snap ring 29. There are several enforcing irons or spokes 17 inside the lower body, at which center a boss 18 is formed, and into which a cap 60 is inserted. A rod portion 51 of the stem 50 is inserted into cap 60. A pathway 26 for flowing external air into the equipment is formed between the irons 14 and 14a.

A horizontal boss 20 is formed as an entity horizontally at the side of the lower body, into which a bushing 21 is inserted, and an eccentric axis 22 is inserted into the bushing 21. Engaged with the upper surface of the eccentric axis 22 is the bottom surface of the cap 60, which is lifted by rotation of the eccentric axis 22, if a handle 23 is turned forcefully. Specifically, when the eccentric axis 22 is rotated slightly, the cap 60 is lifted slightly and thus, a boss 42 engaged around rod portion 51 is also lifted. Therefore, the disc assembled at the enforcing irons or spokes 41 is also a little lifted up along with the stem and external air flows inside the valve device. When the eccentric axis 22 is rotated more, the cap 60 is lifted further until the stem 50 is lifted and a V-shaped valve groove or seat 31 on which the stem was seated, is opened. That is, the eccentric axis 22 and the handle 23 are installed as a preventive measure for insuring normal operation of the valve device by preventing rusting when it is to be used for a long time. If the eccentric axis 22 is returned to its original position, the stem 50 and the disc 40 return to their original positions as well, closing the valve seat 31 and the passage 26.

Figure 4:
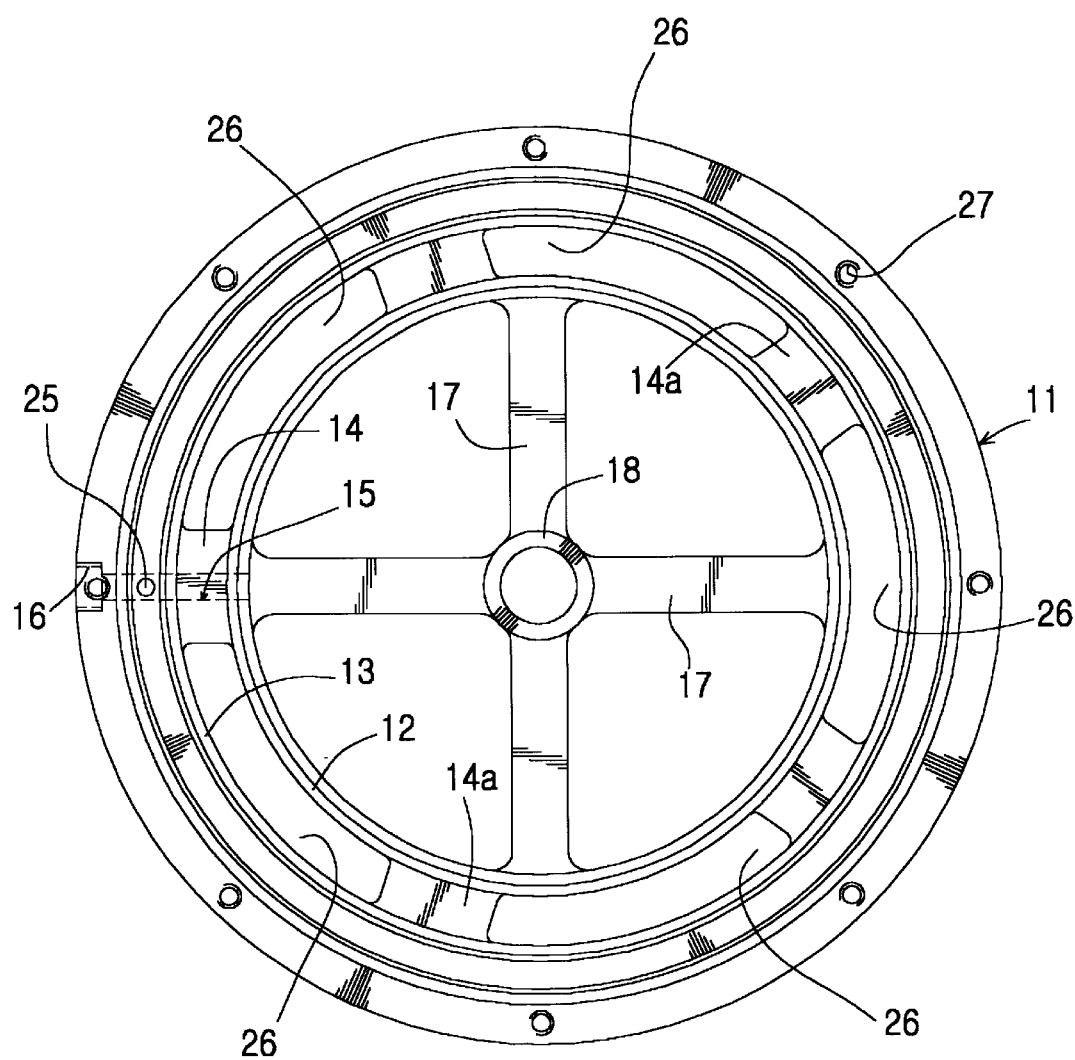
FIG. 4 is a plane view showing a lower body of the device.

As shown in FIGS. 2 and 4, a hole 15 which penetrates into the inner space of the lower body is formed in one connection iron or spoke 14, and a hole 25 which penetrates into the hole 15 vertically, is formed in an external part of the board or ring 13. A screw 16 formed in the hole 15 receives a cock 80 for closing the hole 15. The hole 15 is used as follows: After a long-term use of the valve device according to the present invention, particles, dust and foreign materials contained in water vapor, etc. attach to inner surfaces of the upper and lower bodies as well as surfaces and cleaves of the disc, stem, cap 60, etc. Accordingly, the equipment does not operates smoothly. This material can be removed by loosening the cock 80 and inputting high-temperature and high-pressure water vapor into the hole 15. The hole 25 is used as follows: Water vapor which is evaporated inside the storage tank from water drops condensed inside the upper body, flow along the inner surface of the upper body. The condensed water then enters into the hole 15 through the hole 25, flows down into the lower body, and falls down into the storage tank. Therefore, as the condensed water falls down again into the storage tank although condensed water due to water vapor is generated, there occurs no problem due to the condensed water. Meanwhile, internal cleaning can be smoothly performed by opening the cock 90 in the upper body 30 and inputting high-temperature and high-pressure water vapor as mentioned hereinbefore into the upper body.

Figure 3:
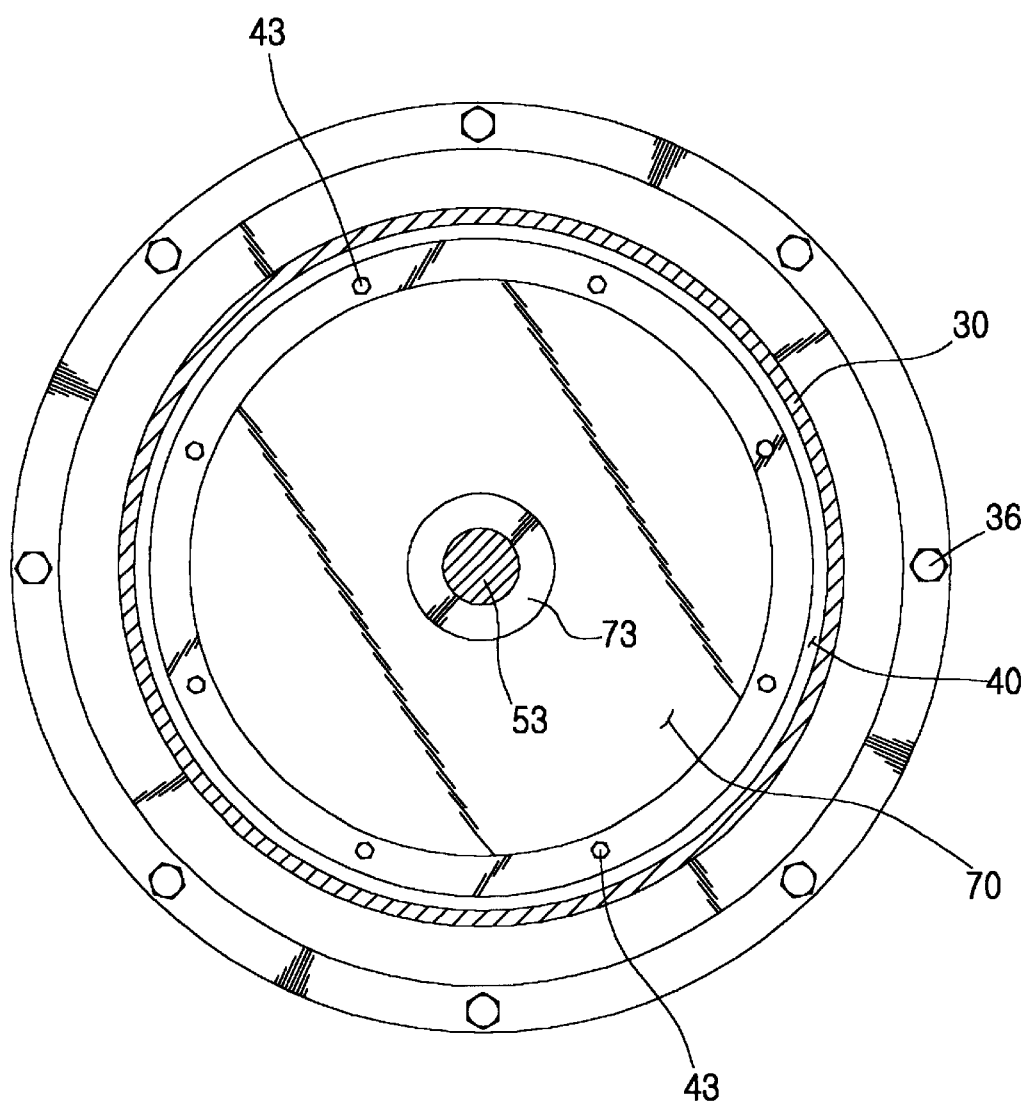
FIG. 3 is a sectional view taken along line 4—4 of FIG. 2.

As depicted in FIGS. 2 and 3, the disc 40 is fastened by bolts 43, below a protrusion or flange 44 having the form of a ring which is formed, as an entity, at the edge of the enforcing iron 41. The disc is not a casting but is a metal (stainless etc.) part formed with a lathe and grinding process. Thus, it does not easily modified, it improves its precise operation and maintains its air-tightness, in comparison with a casting.

An inclined hole or valve opening 32 is formed at the upper end of the upper body 30 and the groove or valve seat 31 having the form of a V is formed thereon, so that the valve face 54 of the stem 50 can be contacted with the V-shaped groove 31. The upper and lower bodies are assembled with each other by the bolts 36, and the present invention is comprised of two parts, and thus, the longitudinal center of the stem 50 is in conformity with those of the upper body 30 and the lower body 10.

At the uppermost end of the stem 50, there is a head portion having the form of triangle in cross-section and having a terminal bolt 55 at the top. A three-stepped rod 51,52,53 is formed at the lower end of stem 50. A screw 52a is provided at the surface of the middle rod portion 52. A hammering prevention disc 70 having a large diameter is engaged to the middle rod portion 52 by a nut 73 and a bushing 74, threaded to threads 52a. Following that, a bushing 74a and the hammering prevention disc 70a having a small diameter are engaged and a bushing 74b is inserted, and a weight 71 is engaged. Finally, the above parts are fixed to the rod portion 52 with a lock nut 72.

The valve face or terminal 54 of the stem 50 is in contact with the V-shaped groove or valve seat 31 of the upper body 30, by the weight of the hammering prevention discs and weight 70, 70a and 71, to thus maintain an air-tight seal.

A hole 61 inside the cap 60 receives the rod portion 51 of the stem 50. Impact, vibration, hammering phenomenon, fluttering phenomenon, etc. due to discharge of the supersaturated gases generated inside of the storage tank can be almost extinguished when the stem moves up and down by having gases circulate through another set of holes 62,62 in the cap. That is, supersaturated pressure is generated in the storage tank, and if gases are to be discharged, they can be discharged through the inclined hole by lifting up the stem 50, but also through the hole 61 and a hole in the rod portion 51, and through the holes 62.

In the meantime, the hammering prevention discs 70 and 70a assist in the elevation of the stem 50 like the wing of an airplane, due to the affect of supersaturated gases as it is discharged. In other words, as the stem is lifted, the rod portion 51 is also lifted while creating a space proportional to the length of elevation at the bottom of the rod portion 51 in the cap 60. Whereas, the pressure of the supersaturated gases discharged, acts on this space and in the hole 61. By such action, buffering is accomplished at the bottom of the ring-shaped rod portion 51 and inside the cap 60, and therefore, up-and-down vibration of the stem, hammering phenomenon, fluttering phenomenon, etc. are almost extinguished when supersaturated gases are discharged, and anti-hammering results are obtained. At this point, it is natural that the hammering prevention discs 70 and 70a contribute to the anti-hammering action. It is most desirable and ideal for a valve device such as the one in the present invention not to hammer when operation. Thereafter, when the stem is lowered by the weight of weight 71, as the supersaturated pressure is somewhat relieved., the bottom surface of the rod portion 51 descends smoothly while discharging gases in the cap 60 through the holes 62. Accordingly, impact due to lowering of the stem is greatly alleviated. The hammering prevention disc 70 assists smooth lowering of the stem at this time as well. Therefore, the cap 60 and the hammering prevention disc 70 play the important role of greatly increasing the durability of the equipment.

If supersaturated pressure is generated in the storage tank again, as mentioned above, gases are discharged, the stem is lowered, and the terminal 54 of the stem 50 closes the groove 31 having the form of V. Accordingly, the up-and-down movement of the stem is repeated non-specifically by the pressure variation inside the tank.

Next, if oils or chemical compounds in the storage tank are discharged (to a tank on the ground or a storage tank of another vessel) by pumping, they are discharged rapidly thus generating negative pressure (vacuum phenomenon) in the storage tank. Therefore, the discharging of the oils or chemical compounds is not facilitated. If this phenomena becomes severe, it is possible that the storage tank is crushed or cracks form at welds or weak portions of the tank. It is not good for a storage tank whether supersaturated pressure is generated or if negative pressure is generated. Therefore, if negative pressure is generated, it is desirable to maintain the standard pressure in the storage tank at all times by having external air enter into the storage tank, and it is safe to keep this state.

If negative pressure is generated in the storage tank, naturally it acts upon the inner spaces of the upper body 30 and the lower body 10. The disc 40 is then lifted a little by the pressure of external air. Therefore, external air flows into the storage tank through the pathway 26 after foreign materials are filtered through the reverse-flow-preventing filter 28 thus relieving negative pressure in the storage tank. After this negative pressure is relieved some what, the disc 40 returns to its original position again and cuts off flowing-in of external air as the inner pressure of the storage tank and atmospheric pressure become almost balanced. The reverse-flow-preventing filer 28 not only assumes a role of filtering foreign materials mixed in the air flowing in the storage tank somewhat, but also prevents entering of flame or source of heat generated externally.

The operation efficiency is good because the terminal 54 formed at the stem is made simply through the lathe process, and it is easy to made the present invention because the form is not difficult. Thus, the V-type groove 31 of the upper body also can be simply made through the lathe process, thereby enhancing the productivity as well as improving the precision.

Also, the hammering prevention discs having large diameter and small diameter are all used in the present invention, the assembling order of the above hammering prevention discs can be changed and the variation of the diameter can be generated. Further, the diameter of the weight 71 can be changed accordingly. As pointed out previously, the present invention can reduce the size and the weight in comparison with the prior art under the conditions of demonstrating identical function, and improve durability.

As may be apparent from the foregoing, the present invention has the effect of facilitating discharge of gases or flowing-in of external air compared to conventional equipments by compacting the upper body and the lower body, so that the stem and the longitudinal centers are in conformity with each other. Its structural characteristics bring in many advantages in that the number of large-sized parts is small and its assembling and repair are convenient, thus leading eventually to be highly economic in that production unit cost is reduced and the time required for its installation is shortened. The valve device according to the present invention is characterized by its small size thus occupying a small space, and particularly, its light weight is effective in reducing the inherent weight of a vessel if it is installed in a ship. It is also advantageous in that the device can be cleaned simply by high-temperature and high-pressure water vapor, and the condensed water formed by water vapor evaporated in the storage tank can be restored into the storage tank again. It is further characterized by its increased durability by inducing the non-hammering action by very effectively relieving the hammering phenomenon, fluttering phenomenon, vibration, impact, etc. of the stem generated when gases are discharged due to supersaturated pressure. In addition, the disc is made not by casting but of lathed and ground metal, thereby improving durability and precision. Likewise, the present invention can improve production by simplifying the structure of the terminal 54, of the stem 50 and the of the V-shape groove 31 of the upper body.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A valve device for a storage tank for transporting oils or chemical compounds, comprising:

an upper body having an inclined hole including a V-shaped valve seat at an upper end of the upper body, and at least one screw hole in the upper body which is closed by a cock;

a lower body having an enforcing frame with connection spokes connected to the upper body, the lower body having two terminals and means defining a plurality of pathways between the connection spokes;

a stem having a three-stepped rod extended into the upper and lower bodies, the rod having a lower end and a screw portion, the stem including a valve face for engaging the valve seat to close the valve device;

a flange supported on the rod by a plurality of enforcing spokes;

a pathway disc coupled to the flange by bolts for covering at least one of the pathways;

two hammering prevention discs connected to the rod of the stem using three bushings and a nut;

a weight engaged below the hammering prevention discs on the rod;

a lock nut engaged to the screw portion of the rod below the weight for holding the hammering prevention discs and the weight to the rod; and a cap having a main hole for receiving the lower end of the rod of the stem and two additional holes communicating with the main hole.

* * * * *